United States Patent [19]
Erickson

[11] 3,916,930
[45] Nov. 4, 1975

[54] THERMAL SHUT-OFF VALVE
[75] Inventor: Linwood P. Erickson, Warren, R.I.
[73] Assignee: G.W. Dahl Company, Inc., Bristol, R.I.
[22] Filed: Oct. 21, 1974
[21] Appl. No.: 516,653

[52] U.S. Cl. .................. 137/75; 137/76; 251/66
[51] Int. Cl.² ....................................... F16K 17/38
[58] Field of Search ............................. 137/72–77; 251/66; 169/19, 40, 42

[56] References Cited
UNITED STATES PATENTS

| | | | |
|---|---|---|---|
| 220,764 | 10/1879 | Leonard | 169/19 |
| 784,210 | 3/1905 | Garrett | 169/40 |
| 1,082,107 | 12/1913 | Carlson | 137/75 |
| 2,765,802 | 10/1956 | Rowell | 137/75 |

Primary Examiner—Martin P. Schwadron
Assistant Examiner—Richard Gerard
Attorney, Agent, or Firm—Salter & Michaelson

[57] ABSTRACT

A thermal shut-off valve comprising a housing having valve means therein movable between an open and closed position, means in the housing normally urging the valve to closed position, and thermal means mounted on the outside of the housing normally maintaining the valve in open position, said thermal means comprising a fusable link, a lever arm having one end in engagement with one end of the fusable link, with its opposite end being releasably and adjustably held in spaced relation to said housing, said lever arm having a fulcrum portion bearing against means associated with the movable valve, whereupon melting of the link releases the lever arm, thus permitting the valve to automatically move to closed position, the arrangement of said lever arm and said fusable link being such that the latter is held under tension by the former.

6 Claims, 6 Drawing Figures

THERMAL SHUT-OFF VALVE

BACKGROUND AND SUMMARY OF THE INVENTION

This invention relates generally to the valve art and is more particularly directed to a shut-off valve which assures immediate and irrevocable shut-down of lines carrying flammable or toxic materials in the event a predetermined ambient temperature level is reached, such as by the presence of a fire in the vicinity of the tank.

Thermal shut-off valves of this type are in common use and are actually required in many installations. For example, OSHA standards specifically state, "Flammable or combustible tanks located inside of buildings . . . shall be provided with an automatic-closing heat-actuated valve on each withdrawal connection below the liquid level . . . to prevent continued flow in the event of fire in the vicinity of the tank."

Shut-off valves of this general type traditionally comprise a housing having a flow path therethrough, said housing carrying a valve member movable between a first position wherein the valve is open so as to permit flow therethrough and a second position wherein the valve is closed so as to block or close flow therethrough. Resilient means normally urge the valve to its closed position, but the thrust of said resilient means is normally counteracted by thermally responsive means which physically block movement of the valve and hence normally maintains the valve in its open position. The thermally responsive means consists of an assembly comprising a fusable link, the arrangement being such that so long as the link is intact the valve is maintained in its open position. Upon fusing or melting of the link pursuant to presence of a predetermined degree of heat, the movable valve is released for automatic movement to closed position pursuant to the urging of the aforesaid resilient means.

Although arrangements of the type generally described above are not new, it has been found desirable to provide a more efficient thermally responsive assembly for maintaining the valve in its open position and for insuring that upon fusing or melting of the fusable link, the valve will be quickly released for automatic movement to closed position.

It is also desirable to provide a thermally responsive assembly whereby the force exerted by the assembly on the movable valve to normally maintain the latter in open position may be readily adjusted.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
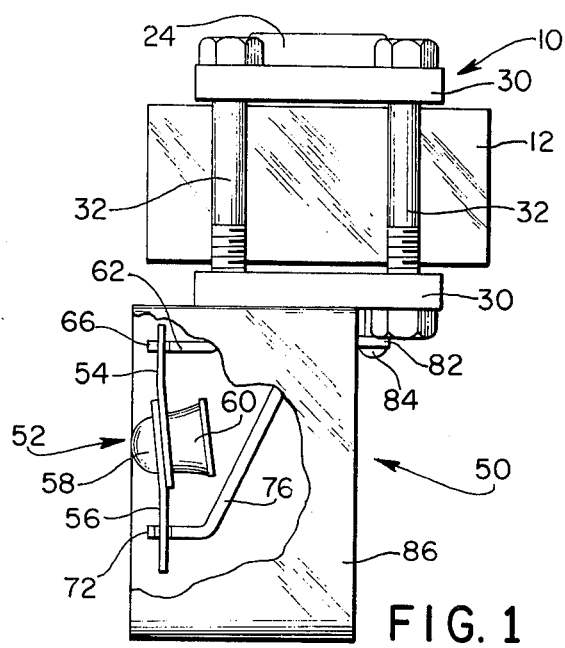
FIG. 1 is a side elevational view of a thermal shut-off valve constructed in accordance with the present invention, with a portion being broken away for purposes of illustration.

Referring now to the drawings, a valve housing is shown generally at 10 comprising an elongated block 12 having an internally threaded port 14 at one end thereof, an inner opening 16 communicating with valve chamber 18, and another inner opening 20 communicating with internally threaded port 22. Secured to the block 12, in alignment with valve chamber 18, is hub member 24 having an internal bore 26, the purpose of which will hereinafter become apparent. Cover member 28 closes off the opposite end of chamber 18, it being noted that hub 24 and cover 28 are secured to block 12 by means of oppositely disposed plates 30 which clampingly receive hub 24 and cover 28 by means of bolts 32.

Figure 3:
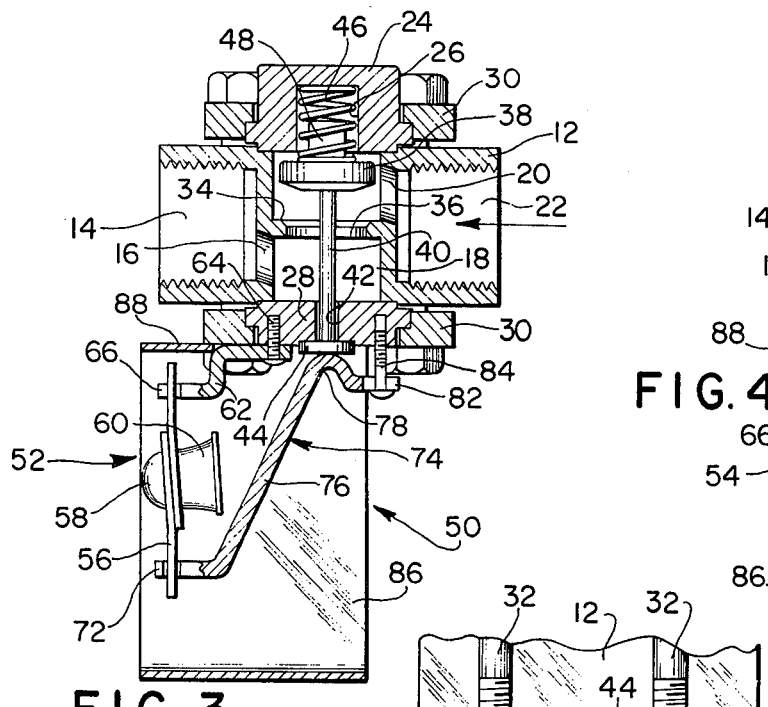
FIG. 3 is a section taken on line 3—3 of FIG. 2.

As will be seen most clearly in FIG. 3, valve chamber 18 comprises valve seat 34 which defines valve orifice 36. Chamber 18 further is provided with a valve member 38 having a stem 40 which slidably extends through opening 42 in cover 28, there being a cap 44 at the outer extremity of stem 40. As will be seen most clearly in FIGS. 3 and 4, bore 26 in hub 24 has positioned therein a coil spring 46 which engages extension 48 on valve member 38 to normally urge valve member 38 toward seat 34 to close or shut off fluid flow through housing 10, the closed position of valve 38 being illustrated in FIG. 4.

In order to maintain the valve 10 in open position against the action of spring 46, but yet permit the valve member 38 to automatically move to closed position in response to the existence of a certain predetermined degree of heat, a thermally responsive assembly shown generally at 50 is provided. The assembly 50 utilizes a fusable link shown generally at 52, said link comprising a first part and a lower part 56 having cup-shaped portions 58, 60, respectively, fused together by suitable means, whereby the presence of a predetermined degree of heat will cause the fused connection between parts 54 and 56 to melt, whereupon said parts may readily separate. It should be noted that fusable links of this type are standard articles of manufacture and specifically are manufactured and sold by Grinnell Corporation of Cranston, R.I., U.S.A. It will further be understood that different links 52 are commercially available for fusing at different temperatures, i.e., standard links may be purchased to fuse at 165° F., 212° F., 286° F., and 360° F. As will be noted, part 54 of link 52 is held in position by a rigid metallic offset strap 62, one end of which is secured to cover 28 by screw 64, while the offset end 66 interengages with opening 68 in part 54. The opposite end of link 52, namely, part 56, is provided with a similar opening 70 which interengagingly receives end portion 72 of a rigid metallic lever arm 74. More specifically, the arm 74 comprises an elongated central portion 76 which communicates at one extremity with end 72 and at its opposite extremity is provided with a reversely curved portion 78 which in turn communicates with outwardly extending end portion 80 having a longitudinally extending slot 82 formed therein. As will be noted, elongated central portion 76 extends angularly so as to make an obtuse angle with end portions 72, 80, said end portions being substantially parallel to each other. A screw 84 extends freely through slot 82 and threadedly engages cover 28, as shown most clearly in FIGS. 3 and 4.

Figure 4:
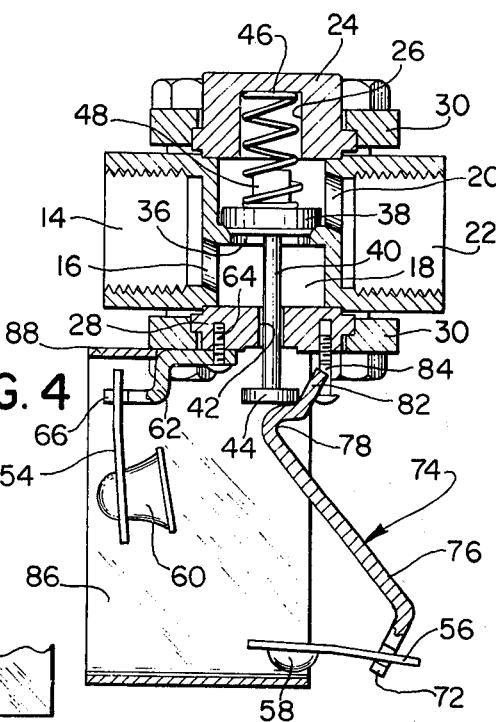
FIG. 4 is a sectional view illustrating the valve in its shut-off position.

It will therefore be seen that offset strap member 62 holds one end of fusable line 52 in spaced relation from the valve housing, while the other end of fusable link 52 is held by the end portion 72 of lever arm 74. The reversely curved portion 78 of lever arm 74 actually functions as a fulcrum and engages cap 44 to maintain same in the closed or sealed position illustrated in FIG. 1, against the action of spring 46. It will be understood that suitable sealing means, such as O-rings or the like (not shown) may be provided on the underside of cap 44 to insure that when the cap is in its closed position it will make a tight, fluid-proof seal with cover 28. The lever arm 74 is held in the position illustrated in FIG. 3 by virtue of the fact that its end 72 is interengaged with the end of fusable link 52 and in view further of the fact that its opposite end 80 is held in spaced relation to the housing 10 by means of screw 84. As will be apparent, lever arm 74 imparts a tensile force to fusable link 52, which force may be adjusted by manipulating screw 84 inwardly or outwardly. More specifically, if the screw 84 is screwed inwardly into cover 28, a counterclockwise moment is imparted to lever arm 74 which tends to increase the tensile force on fusable link 52, whereas if screw 84 is screwed outwardly, then said tensile force is lessened. It has been found to be extremely desirable to maintain the fusable link 52 under some degree of tension, so that upon melting or fusing of the link pursuant to the presence of the predetermined temperature, said tensile force will insure prompt separation of the link parts 54 and 56, whereupon lever arm 74 is released and will automatically swing to an inoperative position, thus relieving the force on cap 44 which in turn permits valve member 38 to move to closed position under the impetus of spring 46, all as illustrated in FIG. 4. It will be understood that since slot 82 in end portion 80 of lever arm 74 is wider than the diameter of screw 84, end portion 80 is free to slidably disengage itself from screw 84, as illustrated in FIG. 4.

Figure 2:
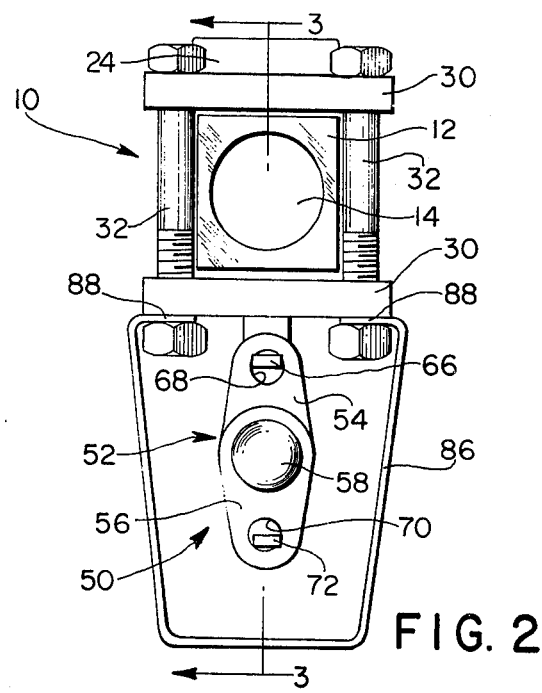
FIG. 2 is an end view thereof.

A shield member 86, preferably metallic, surrounds the thermal-responsive assembly 50 to mechanically protect same, although said shield member, being open at its ends, does not impede communication between the assembly 50 and the surrounding atmosphere. Shield 86 may be secured to housing 10 by any suitable means, such as by inwardly extending flanges 88 secured to plate 30 by the bolts 32, as shown most clearly in FIG. 2.

Figure 5:
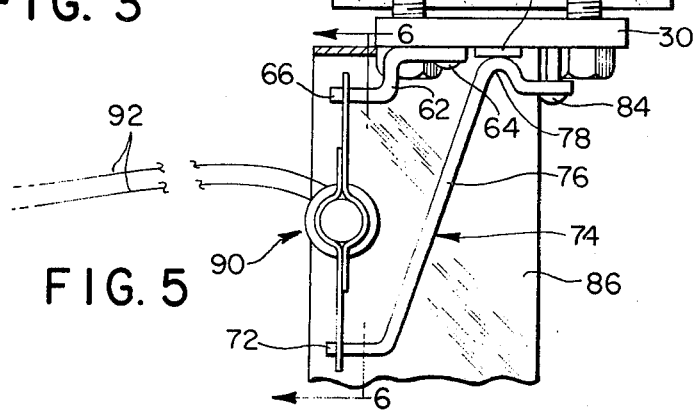
FIG. 5 is a fragmentary end view of a slightly modified form of my invention.
Figure 6:
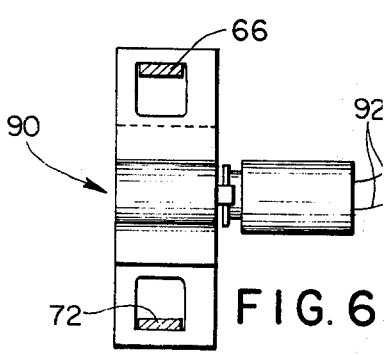
FIG. 6 is a section taken on line 6—6 of FIG. 5.

It will be understood that other shut-off valves may be used with the thermal assembly 50 in the same combination above described, it only being important that the valve have a sealing cap similar to the cap 44, which cap is connected to some kind of a stem, movement of which causes the valve to open and close. Also, although the combination illustrated in FIGS. 1 through 4 is operative in response to ambient temperature in the location of the assembly, it is also possible to utilize the basic concept of this invention to shut off a valve in response to the presence of heat or fire at a remote location. Such an arrangement is shown in FIGS. 5 and 6; and since it will be understood that the details of the valve per se may be identical to the valve illustrated in FIGS. 1 through 4, no further description of same is necessary. Also, the thermally responsive assembly 50 is the same as that illustrated in FIGS. 1 through 4, with the single exception that a different fusable link is used. Thus, in FIGS. 5 and 6, an electro-thermal link 90 is employed in place of the fusable link 52, the link 90 also being a standard article of manufacture, and specifically is a component manufactured and sold by Air Balance, Inc., of Chicago, Ill. The only difference between the link 90 and the link 52 is that the link 90, instead of being melted or fused by ambient thermal conditions, is melted by an electrical impulse which passes through the wires 92 from any suitable source. Thus, the electro-thermal link may be tied into any electrical alarm or detection system, whereupon the presence of smoke, fire, or undue heat at any location within a building activates an electrical circuit which would pass sufficient current to link 90 to melt same, whereupon the exact same mechanical action would take place, as illustrated in FIG. 4.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A thermal shut-off valve comprising a valve housing, means within said housing movable between a first position wherein said valve is open so as to permit flow therethrough and a second position wherein said valve is closed so as to block flow therethrough, means within said housing normally urging said movable means toward said second position, and thermally actuated means mounted outside of said housing normally maintaining said movable means in said first position, said thermally actuated means comprising a fusable link, first means holding one end of said link, and second means holding the other end of said link, said first and second means cooperating so as to hold said link under tension, said second means comprising a rigid lever arm having a fulcrum portion, one end of said arm engaging said other end of said link, and means adjustably and releasably holding the other end of said arm in spaced relation to said housing with said fulcrum portion in blocking engagement with said movable means to prevent movement thereof to said second position, whereby when said link fuses due to the presence of a predetermined degree of heat, the tension exerted on said link by said lever arm causes said link to separate, thus releasing said lever arm whereby said fulcrum portion automatically moves away from said blocking engagement, thus permitting said movable means to move said second position pursuant to the impetus of said urging means.

2. In the valve of claim 1, said adjustable and releasable holding means comprising a screw threadedly attached to said housing with the head of said screw spaced therefrom, said other arm end having a slot freely receiving said screw, whereby tightening of said screw causes said arm to pivot about said fulcrum portion to increase the tension on said link, and vice versa.

3. In the valve of claim 2, said first holding means comprising a rigid metallic strap having a first end secured to said housing and a second offset end spaced from said housing, said second end holding said one end of said link in spaced relation to said housing.

4. In the valve of claim 3, said first and second holding means holding said link so that the latter extends substantially perpendicular from said housing.

5. In the valve of claim 4, a rigid shield surrounding said thermally actuated means.

6. In the valve of claim 1, said rigid lever arm comprising a metallic strap having an elongated central portion reversely curved at one extremity to define said fulcrum portion, the adjacent end of said arm extending outwardly from said reversely curved portion, the opposite end of said arm extending from the opposite extremity of said central portion in a direction opposite from said adjacent end, said ends being substantially parallel to each other and each making an obtuse angle with said central portion.

* * * * *